United States Patent
Gagnon et al.

(10) Patent No.: US 7,079,747 B1
(45) Date of Patent: *Jul. 18, 2006

(54) THREE DIMENSIONAL THERMO-ELECTRO-MECHANICAL DEVICE FOR CONTROLLING LIGHT PROPAGATION IN AN OPTICAL GUIDE

(75) Inventors: Bertrand Gagnon, Lévis (CA); Tigran Galstian, Sainte-Foy (CA); Amir Tork, Sainte-Foy (CA); Armen Zohrabyan, Sainte-Foy (CA); Dany Dumont, Québec (CA); Rouslan Birabassov, Québec (CA); Richard Peter Glynn Jewell, Québec (CA)

(73) Assignee: Photintech Inc., Ste-Foy (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/060,404

(22) Filed: Feb. 18, 2005

Related U.S. Application Data

(60) Provisional application No. 60/548,170, filed on Mar. 1, 2004.

(51) Int. Cl.
*G02B 6/00* (2006.01)
(52) U.S. Cl. .................... 385/140; 385/12; 385/123
(58) Field of Classification Search ................. 385/12, 385/27, 122–124, 140; 359/227–236
See application file for complete search history.

(56) References Cited

U.S. PATENT DOCUMENTS

| | | | | |
|---|---|---|---|---|
| 6,151,438 A | * | 11/2000 | Espindola et al. | .......... 385/140 |
| 6,240,226 B1 | | 5/2001 | Presby et al. | ................. 385/42 |
| 6,466,729 B1 | | 10/2002 | Wagoner et al. | ............. 385/140 |
| 6,483,981 B1 | | 11/2002 | Krahn et al. | ................. 385/140 |
| 6,671,439 B1 | | 12/2003 | Dieckröger | .................... 385/50 |
| 2003/0103708 A1 | | 6/2003 | Galstian et al. | ................. 385/1 |

OTHER PUBLICATIONS

Kawashima, Hiroshi et al., Ultra-Low PDL PLC based Thermo-optic VOA, The Furukawa Electric Co., Ltd., Chiba, Japan.

(Continued)

*Primary Examiner*—Phan Palmer
(74) *Attorney, Agent, or Firm*—Kent Daniels; Ogilvy Renault LLP

(57) ABSTRACT

A variable optical attenuator comprises a portion of a waveguide through which optical energy can propagate having a side surface through which optical energy can be extracted; a layer of thermo sensitive material having controllable optical properties, covering the side surface of the portion; a helicoidal heating element wrapped around the waveguide and covering at least the layer. The helicoidal heating element can be used to control the optical properties of the material by inducing a thermal transfer profile on the material using the heat dissipation of the heater through the material; wherein a wave propagation in the waveguide is influenced by the optical properties of the material controlled by the heating element. The heating element can also have a measurable temperature coefficient; a controller for controlling the temperature of the heating element as a function of the temperature coefficient; wherein the temperature of the heating element can be controlled without using an additional temperature probe. And the heating element can also be used to control the curing of the material using the heat dissipation of the heater through the material, thereby providing a mechanical armature for the material and the waveguide; wherein the mechanical armature solidifies the attenuator.

13 Claims, 5 Drawing Sheets

OTHER PUBLICATIONS

Eggleton, Benjamin J., Tunable and switchable microstructured optical fibers: Enabling advanced photonic devices, OFS Laboratories & OFS—Specialty Photonics Division, Somerset, NJ.

Eggleton, Benjamin J., Integrated Tunable Fiber Gratings for Dispersion Management in High-Bit Rate Systems, Nournal of Lightwave Technology, vol. 18, No. 10, Oct. 2000, Murray Hill, NJ.

* cited by examiner

THREE DIMENSIONAL THERMO-ELECTRO-MECHANICAL DEVICE FOR CONTROLLING LIGHT PROPAGATION IN AN OPTICAL GUIDE

This application claims the benefit of Provisional Application No. 60/548,170, filed Mar. 1, 2004.

FIELD OF THE INVENTION

The present invention relates to tuneable optical waveguide components and more specifically to variable optical attenuators used in optical communications, optical signal processing and optical telecommunications devices.

BACKGROUND OF THE INVENTION

The temperature dependence of devices may be an important factor affecting their precision and their basic operation. This is particularly important in the case where the temperature is a control parameter for device operation. Many temperature-controlled devices have been developed so far for various applications, including the field of optical telecommunications.

The in-guide modulation of light propagation (light remains in the original waveguide while being transformed) appears to be the best solution for the fabrication of low loss optical components. Its main underlying principle is the use of the evanescent part of the guided light to affect it dynamically. The traditional way to do this is the removal and replacement of a part of the cladding of the guide and the dynamic change of the optical properties of that part of cladding, particularly in the area where the evanescent field propagates. In the case of the variable optical attenuator (VOA) application, the materials used must have relatively high sensitivity to the external excitation (e.g., thermal) to provide sufficiently high refractive index changes (compared to the refractive index of the core of the guide) and corresponding light attenuation.

Composite materials, such as polymers, have been proposed as good candidates for such applications. This class of materials is well adapted for low-cost fabrication techniques and is easy to manipulate in comparison with complex and costly operations needed to fabricate semiconductor components such as micro electro mechanical systems (MEMSs).

One of the frequently used properties of polymers is their high sensitivity to external excitation signals, such as temperature, which reduces the electrical power consumption of the device. Thus, U.S. Pat. No. 6,240,226 to Presby et al. for a "Polymer material and method for optical switching and modulation" describes a planar Mach-Zender interferometer employing a section of thermo-optic polymer cladding in one branch, the polymer cladding having an index of refraction that varies with temperature. The temperature of the section of polymer cladding is adjusted, for example by a planar electrical heater, to cause a corresponding change in the refractive index of the polymer and consequently in the phase of the light flowing through the waveguide core bounded by the polymer cladding to achieve a desired switching or modulation of light. The device is well adapted to be fabricated in a cost effective (printed circuit) way.

In FIG. 1 (PRIOR ART), the cross section of a thermally controlled polymer planar waveguide is schematically presented. Light may be guided in the direction perpendicular to the drawing surface in the core area 102 (a channel guide created in the layer 101), typically fabricated on a substrate layer 103. In the case where light is guided in the core 102, the layers 101 and 103 are applied as low refractive index claddings for the core 102. To achieve a dynamic control of light propagation, an electro-conductive layer 104 (e.g., a thin film electrode) is fabricated on the top of the layer 101, close to the core area 102. The typical operation of this device is based on the control of the refractive index of the core 102 (and/or of the layer 101) by means of an electrical current flowing through the electrode 104 that releases heat. The released heat leads to a controllable refractive index change and consequently to a phase shift of the guided light and thus to its variable attenuation. The attenuation is typically achieved via the destructive interference of a Mach-Zender interferometer.

An important problem persists with the above-mentioned architectures (polymer materials and planar asymmetric geometries) that is related to the relatively high shrinkage and stress induced optical birefringence of the applied thermo-optic polymers, which results into undesired polarization dependant loss (PDL). Indeed, during the fabrication of the polymer layer, the shrinkage-induced stress (due to the asymmetry of boundary conditions of the polymer layer) and corresponding birefringence may create strong PDL. In addition, during the operation (e.g., thermal switch) of the device, the release of heat (by means of the electrode 104) in an asymmetric way usually leads to the creation of additional stress, birefringence and corresponding PDL. That is why many additional efforts were deployed to reduce the PDL. For example, the work of H. Kawashima, N. Matsubara, K. Nara, and K. Kashihara, entitled "Ultra-Low PDL PLC based Thermo-Optic VOA" and published in ECOC-IOOC 2003 Proceedings—Vol. 3, Paper We3.2.4, pp. 498–499, describes significant PDL reduction by creating specific air-channels 105 (see FIG. 1) in the polymer layer 101 that allow the lateral expansion of the polymer film and reduction of the stress induced birefringence.

However, the coupling of light from planar photonic circuits to standard optical fibers (or vice versa) is usually accompanied by high optical losses due to the guided light mode mismatch when propagating in fibers (cylindrical geometry) and the above-described planar geometries. The use of all-fiber devices would significantly decrease the insertion losses of the system and facilitate the assembly tasks. That is why the idea of using the approach of thermo-optic polymer cladding has attracted much attention in the fiber geometry. Thus, U.S. Pat. No. 6,466,729 to Wagoner et al. entitled "Controllable fiber optic attenuators employing tapered and/or etched fiber sections" describes controllable fiber optic attenuators and attenuation systems for controllably extracting optical energy from a fiber. In contrast with the interferential attenuation described above, a simple leakage of optical radiation is traditionally used in the fiber geometry. Thus, a portion of the optical fiber is etched or tapered, thereby providing a side surface, coated with the thermo-optic material, through which optical energy can be extracted by means of the thermal control of the refractive index of the coated material by a heater/cooler element.

U.S. Pat. No. 6,483,981 to Krahn et al. entitled "Single-channel attenuators" describes a VOA comprising a controllable heating/cooling source in contact with a polymer composition, wherein the controllable heating/cooling source provides a controllable stimulus to the polymer composition to change the temperature thereof and to adjust the refractive index of the polymer composition.

The heating electrode configuration is a paramount issue in these inventions. Several geometries have been proposed to increase the functionality of those electrodes, using for example, metal heaters with tapered thickness and corresponding electrical resistance, see for example the work of B. J. Eggleton, et al. published in Journal of Lightwave Technology, vol. 18, pp. 1418–1432, 2000. The heat release being proportional to the electrode resistance, this device allows refractive index control with a tunable gradient. Multiple electrodes (with uniform and tapered thickness) along with temperature sensors have also been proposed to achieve a better control of spectral properties of the fiber. See for example the work of J. A. Rogers and B. J. Eggleton, entitled "Temperature Stabilized Operation of Tunable Fiber Grating Devices that Use Distributed on-fiber thin film heaters", Electronics Letters, vol. 35, pp. 2052–2053, November 1999.

In spite of the noticeable progress achieved (for example very low insertion losses), the fiber attenuators still have significant drawbacks. Two key remaining difficulties are the heating electrode asymmetry and the inhomogeneities (non uniformities, such as low precision of its quantity and geometrical shape) of the thermo-optically controllable polymer that is replacing a part of the fiber cladding. In fact, very often, the controllable material initially is a monomer solution, which is then polymerized by thermal and/or UV curing. Non uniformities and bubbles are then formed if a solid ("closed") container is used to support the initial liquid solution. Otherwise, asymmetric boundary conditions are generated if the initial solution is just cast on the fiber surface. Those non uniformities and asymmetry of the final polymer form generate stress-induced optical birefringence and strong PDL, which is a major problem. Finally, the asymmetry of the control electrode and corresponding heat release during the operation of the device usually aggravates the PDL problem.

The fabrication of fiber-based attenuation devices and the precise control of their properties thus remain a difficult task. The methods and elements described above are complex, not efficient and costly. The corresponding fabrication methods and operation principles do not allow the simple control of device parameters, in particularly the PDL.

SUMMARY OF THE INVENTION

In view of the above, there is a need for a specifically designed electrically controllable component for a cost-effective fabrication of VOA with well-controlled parameters and, in particularly, with low PDL.

A three-dimensional thermo-electro-mechanical device of the present invention can fulfill multiple functions required both during fabrication and operation of many electro-optic devices. The invention includes an element and control means that allow the control of the mass, shape, mechanical robustness and temperature of an optical guide and its dynamic control by means of a feedback and control system.

The present invention relates to a three-dimensional thermo-electro-mechanical device (3DTEMD) that can simultaneously fulfill multiple functions required both during fabrication and during operation of many electro-optic devices. The invention may be particularly useful for the control of optical properties (e.g., refractive index and optical loss coefficient) of optical guides, which contain materials that are sensitive to an external excitation signal provided by the disclosed 3DTEMD.

The invention also relates to an electrical element and control means that allow the measurement of the temperature of an optical guide and its control by means of a feedback and control system. At the same time, the described element is designed in a way to provide symmetry degrees and volume restrictions required for the precise control of optical guide properties, such as polarization dependant loss (PDL and response time values.

Thus, it is an object of the present invention to address the above problems by providing a multifunctional 3DTEMD that allows the precise control of the mass and shape of the replaced cladding, as well as the thermal field distribution and elasto-mechanical properties of the guide. The element has a 3D shape, elasto-mechanical properties and electrical conductivity resistance that allow: a) the precise control of the mass and the shape and the homogenous deposition of the thermo-optic material during the device fabrication; b) the creation of an excitation field (e.g., heating) with specific symmetry properties to control the refractive index of the material that replaces the part of the waveguide cladding, thus reducing the PDL of the device; c) providing an electrical feedback signal to monitor the temperature of the cladding; and d) providing specific mechanical and elastic properties of the whole fiber assembly that has a part of fiber cladding removed and replaced by the material and which is surrounded by the 3D element.

The 3DTEMD according to the present invention is particularly interesting in guided wave electrical modulation applications where the geometrical parameters and material composition of that element would allow the fabrication, direct control and feedback control of the modulation value in optical devices such as VOAs.

One possible version and application of the 3DTEMD comprises a guiding element, preferably an optical fiber, with a part where the evanescent field of light propagates in a surrounding material with controllable optical properties, such as refractive index, scattering, absorption, etc. The portion may be obtained by various methods, including fiber etching, fusion tapering, etc. The control of the optical properties of the material may be achieved for example by the variation of its temperature.

In a particular embodiment of the present invention, the controllable material is a thermo-optic polymer. The 3DTEMD is an electrode of a specific composition and geometry. In general, it has a three dimensional, for example, helicoidal shape. The helix is created with specific spatial period, diameter and portions that surround the part of the fiber (with original or partially reduced diameter) neighboring the area of interest.

In another aspect of the present invention, the geometrical properties of the 3DTEMD may be controlled in a way to achieve the desired spatially varying modulation of the waveguide's optical properties, for example by modifying (e.g. linearly or non linearly chirping) the step of the helix or its diameter.

In another aspect of the present invention, the 3DTEMD may be used with a fiber of original diameter (without tapering, etching or otherwise clad removing), which however contains cladding modes (previously created by mode converters) and a controllable optical material surrounding the original fiber cladding.

The invention includes an element and control means that allow the control of the mass, shape, mechanical robustness and temperature of an optical guide and its dynamic control by means of a feedback and control system.

Some aspects of the present invention are as follows: a thermo-electro-mechanical device having a three-dimensional geometrical shape and temperature sensitive electrical resistance; an application of the 3DTEMD as a container to house various controllable materials, such as thermo-optic monomers and polymers; an application of the 3DTEMD as a means to control precisely the mass of the polymer layer; an application of the 3DTEMD as a means to control precisely the geometrical shape of the polymer layer; an application of the 3DTEMD as a means to obtain uniform polymer cladding with desired symmetry properties; an application of the 3DTEMD as a means to obtain excitation fields of desired spatial shape and symmetry; a method of obtaining the desired excitation field's spatial shape and symmetry by changing the cross-section profile, diameter and periodicity of the 3DTEMD; an application of the 3DTEMD as a means to obtain desired information about the temperature of the optical guide assembly via the temperature dependence of its resistance or other measurable parameter; an application of the 3DTEMD as a means to control the temperature of the optical guide assembly via the electrical current heat release and an application of the 3DTEMD as a means to obtain desired elasto-mechanical properties of the whole assembly.

The 3DTEMD can therefore heat the temperature controllable material, can change its own electric resistivity as a function of its temperature allowing detection of its temperature by measurement of its electric resistivity and can act as a housing or "cage" to reinforce the waveguide on which it is wrapped.

According to a first broad aspect of the present invention, there is provided a variable optical attenuator. The variable optical attenuator comprises a portion of a waveguide through which optical energy can propagate having a side surface through which optical energy can be extracted; a layer of thermo sensitive material having controllable optical properties, covering the side surface of the portion; a helicoidal heating element wrapped around the waveguide and covering at least the layer to control the optical properties of the material by inducing a thermal transfer profile on the material using the heat dissipation of the heater through the material; wherein a wave propagation in the waveguide is influenced by the optical properties of the material controlled by the heating element.

According to another broad aspect of the present invention, there is provided a variable optical attenuator. The variable optical attenuator comprises a portion of a waveguide through which optical energy can propagate having a side surface through which optical energy can be extracted; a layer of thermo sensitive material having controllable optical properties, covering the side surface of the portion; a helicoidal heating element wrapped around the waveguide and covering at least the layer to control the optical properties of the material by inducing a thermal transfer profile on the material, wherein the heating element has a measurable temperature coefficient; a controller for controlling the temperature of the heating element as a function of the temperature coefficient; wherein the a temperature of the heating element can be controlled without using an additional temperature probe.

According to still another broad aspect of the present invention, there is provided a variable optical attenuator. The variable optical attenuator comprises a portion of a waveguide through which optical energy can propagate having a side surface through which optical energy can be extracted; a layer of thermo sensitive material having controllable optical properties, covering the side surface of the portion; a helicoidal heating element wrapped around the waveguide and covering at least the layer to control the curing of the material using the heat dissipation of the heater through the material, thereby providing a mechanical armature for the material and the waveguide; wherein the mechanical armature solidifies the attenuator.

In short, the variable optical attenuator comprises a portion of a waveguide through which optical energy can propagate having a side surface through which optical energy can be extracted; a layer of thermo sensitive material having controllable optical properties, covering the side surface of the portion; a helicoidal heating element wrapped around the waveguide and covering at least the layer. The helicoidal heating element can be used to control the optical properties of the material by inducing a thermal transfer profile on the material using the heat dissipation of the heater through the material; wherein a wave propagation in the waveguide is influenced by the optical properties of the material controlled by the heating element. The heating element can also have a measurable temperature coefficient; a controller for controlling the temperature of the heating element as a function of the temperature coefficient; wherein the temperature of the heating element can be controlled without using an additional temperature probe. And the heating element can also be used to control the curing of the material using the heat dissipation of the heater through the material, thereby providing a mechanical armature for the material and the waveguide; wherein the mechanical armature solidifies the attenuator.

Other aspects and advantages of the present invention will be apparent upon reading the following non-restrictive description of several preferred embodiments, made with reference to the accompanying drawings.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS OF THE INVENTION

A multifunctional three-dimensional thermo-electro-mechanical device (herein referred to as 3DTEMD) is disclosed, which simultaneously allows the precise management of several key parameters of dynamically controllable optical devices.

Figure 1:
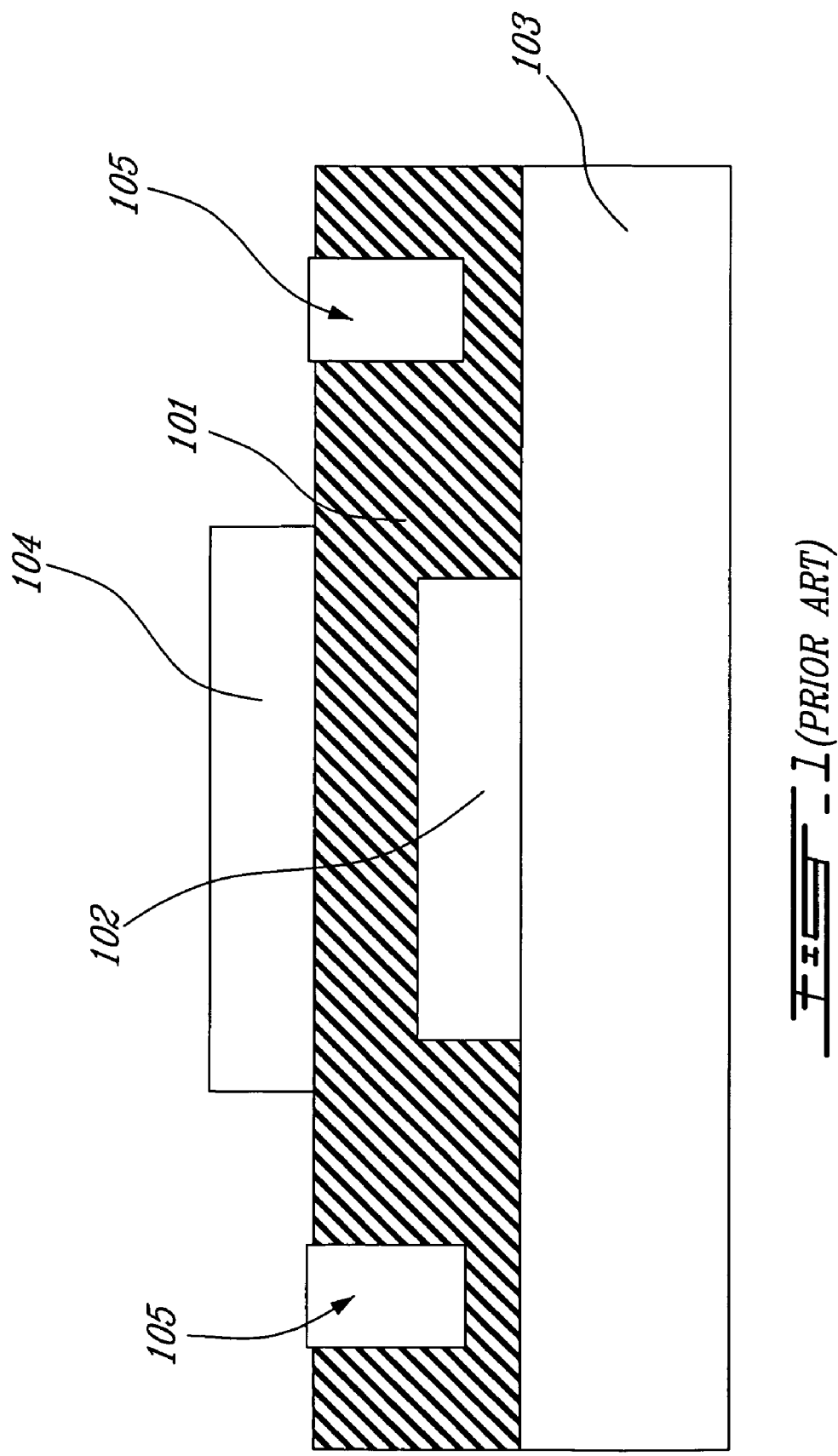
FIG. 1 ("PRIOR ART"), is a schematic representation of the geometrical reduction of the PDL in an optical waveguide using a thermo-optic polymer for the control of light propagation properties as is done in the prior art.
Figure 2:
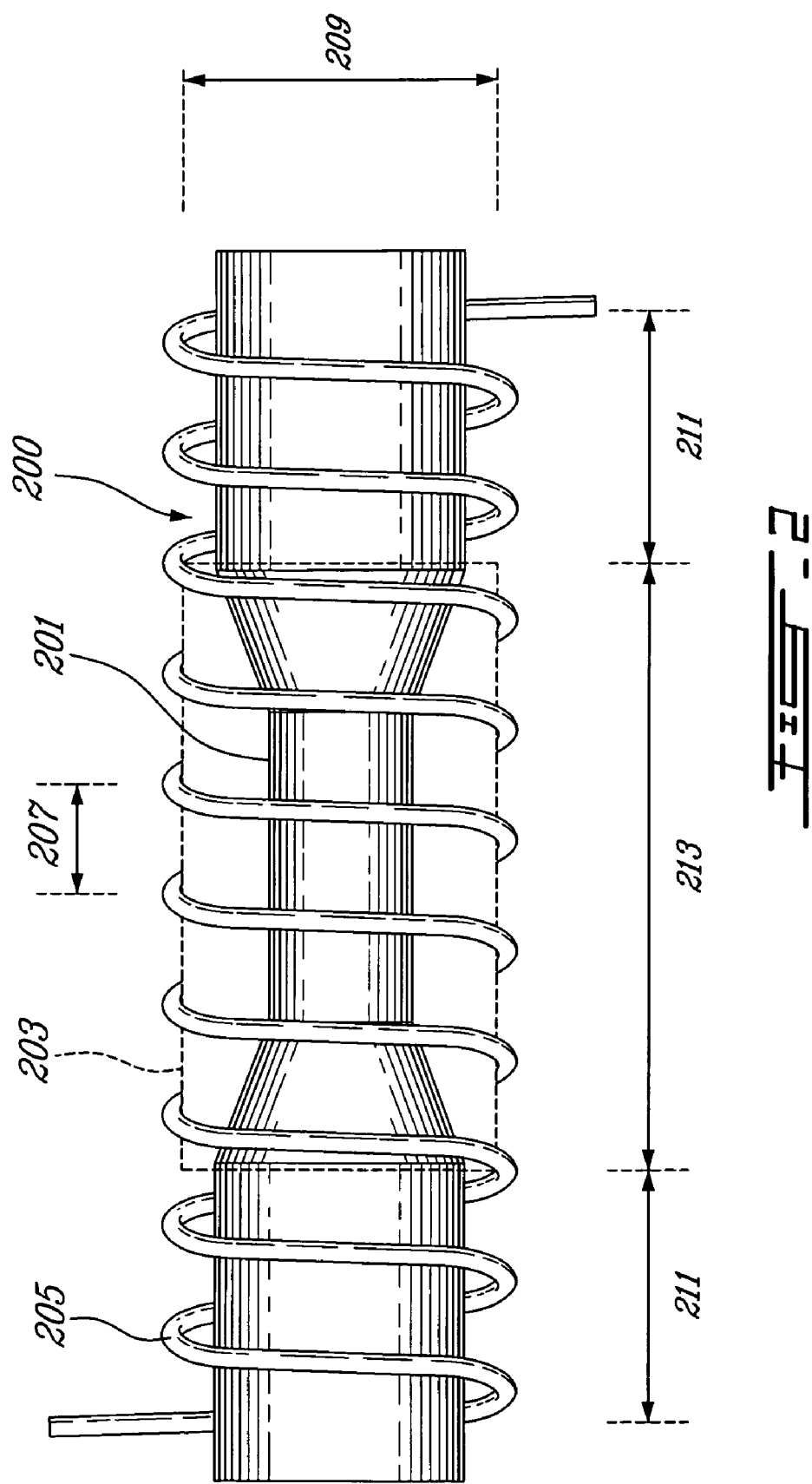
FIG. 2 is a schematic graphical representation showing a fiber waveguide of modified geometry (partially reduced cladding, tapered, etc) with the disclosed 3DTEMD that allows the fabrication of a device and the control of light propagation by means of a controllable material placed in the area where the evanescent field of the guided light propagates.

The utility of this invention may be appreciated using the schematic graphical representation of FIG. 2, which shows one possible version of the 3DTEMD and its fiber-VOA application. The guiding element used is an optical fiber 200, which contains a part 201 of processed cladding. This part is made to allow the evanescent field of guided light to partially propagate in a material that surrounds the fiber part 201 and is enclosed by the dashed contour 203. The material 203 has optical properties (such as refractive index, scattering, absorption, etc.) that may be dynamically controlled by external excitation means. The portion 201 may be obtained by various well-known methods, including fiber etching, fusing tapering, etc. The control of the optical properties of the material 203 may be achieved, for example, by the variation of its temperature. The material is preferably a low refractive index (such as fluoride) material. The disclosed 3DTEMD element 205 surrounds the fiber 200 (including the parts 201 and 203) and allows both the yield-efficient fabrication of the whole device and the dynamic control of light propagation in the fiber 200.

Usually, the controllable thermo-optic polymer cladding is initially deposited in the form of a liquid monomer solution. To support this solution around the fiber part 201, uniform tubes, cylinders and prism-like boxes are frequently used. However, the solidification of the monomer solution (for example, initiated by heat and/or light curing) leads to volume shrinkage. This, in turn, generates stress-induced birefringence and spatial non-uniformities, such as air bubbles. As a result, the fiber VOA demonstrates high polarization dependant loss (PDL) and high insertion losses.

In a first embodiment of the present invention, the disclosed 3D geometry electrode 205 (e.g., of helicoidal shape) provides an effective cavity ("quasi-open" and "elastic") of precisely controlled volume 203 to contain the controllable material in its different phases (liquid and solid). Experiments with the present invention have shown excellent reproducibility of the volume and mass obtained. The control of mass is important for several reasons, including the response time of the device that depends upon the mass in the case of a thermo-optic mechanism of control. The electrical power consumption of such a device also depends on its mass.

In contrast with other traditionally used solid containers, the 3D electrode 205 provides a "quasi-open" cavity that allows a bubble-free evaporation, solidification or other volume changes of thermo-optic materials. Those changes occur due to the volume shrinkage caused by polymerization (during fabrication) and thermal expansion (during the thermal switch, etc.). The effective "porosity" or "quasi-open" character of the 3DTEMD significantly helps to release the stress and consequently to reduce the stress-induced optical birefringence and corresponding PDL. It is important to note that the pitch of the shape of the 3DTEMD cannot be too dense otherwise the 3DTEMD will lose its quasi-open nature.

In a second embodiment of the present invention, the proposed device 205 provides a high symmetry of excitation. For example, the thermal excitation field created by element 205 will be symmetric with respect to the fiber axis, which is also useful to obtain an as small as possible asymmetry of heat-induced stresses. This, in turn, will generate small integral optical birefringence and correspondingly small PDL. At the same time this pitch can not be too large neither since; in this case, the liquid solution will escape the cavity of the 3DTEMD before the solidification.

In a third embodiment of the present invention, the proposed device 205 provides specific mechanical and elastic properties for the fiber 200 that has a part of its cladding 201 removed and replaced by a controllable material 203 surrounded by the element 205. The two surrounding parts 211 of the electrode 205 that embrace the original fiber 200 may be used to solidify the relatively fragile part 201 of the fiber 200. This "armature" structure will also allow to partially release the elastic stresses that may be applied to the fiber 200. The elasto-mechanical properties of electrode 205 may be easily controlled by the choice of the material of the electrode, its geometrical shape, its periodicity step 207, the diameter of its coiling 209, etc. The geometrical shapes of the proposed 3DTEMD may be selected from a considerably wide range of possibilities, such as with a circular, elliptical, square, and rectangular cross section, etc. The 3DTEMD may be uniform, chirped, apodized, etc.

Various heat distribution patterns may be obtained with the corresponding choice of the geometrical shape of the 3DTEMD. The helicoidal pitch can be adjusted along the length of the fiber to provide variability of the heat generation density spatial profile.

Figure 3:
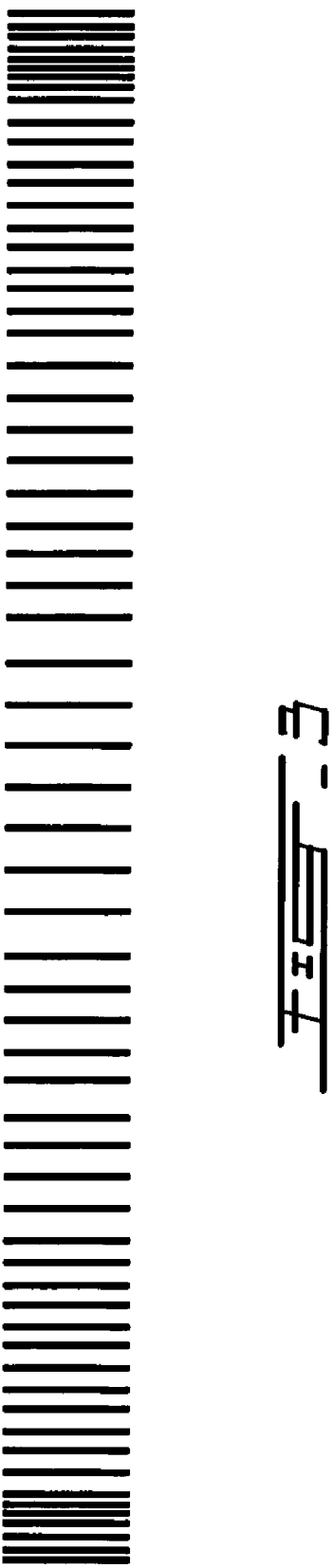
FIG. 3 is a schematic graphical representation of a modulation of the pitch of the helicoidal structure.

As an example, it may be desired to have a temperature distribution as flat as possible through the heater length, even though the temperature is naturally higher in the center of a homogeneous heating structure. By making the pitch smaller at both ends of the helicoidal structure (see FIG. 3), one may compensate this natural effect and create a more constant temperature profile.

Figure 4:
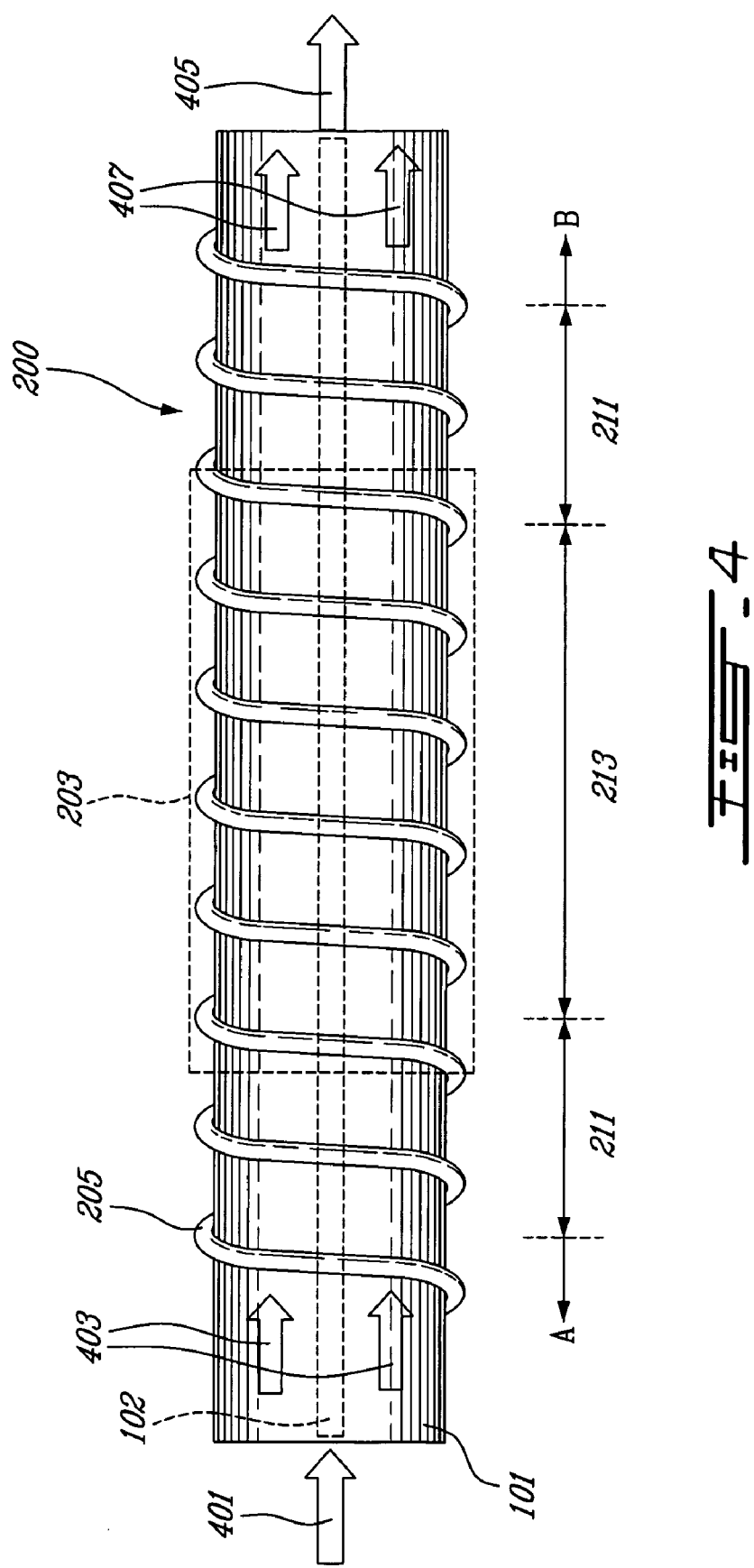
FIG. 4 is a schematic graphical representation showing a fiber waveguide of an original geometry with the proposed 3DTEMD that allows the fabrication of a device and the control of light propagation by means of a controllable material placed in the area where the guided light cladding modes' evanescent field propagates.

In another embodiment of the present invention, the disclosed 3DTEMD may also be used with a standard fiber or other kinds of guiding structures. FIG. 4 is a schematic graphical representation showing a fiber waveguide 200 of standard geometry with the 3DTEMD element 205 that allows the fabrication of a device and the control of light propagation losses by means of a controllable material placed in the area 203 where the cladding modes' evanescent field of light propagates. The previously-described removing of the fiber cladding may be laborious and may also create a relatively fragile zone (part 201 in FIG. 2). To avoid these complications, element 205 may be directly fabricated on the original fiber cladding 101. In this case, however, the evanescent field of the light 401 that is guided in the core 102 will not be accessible to the controllable material 203. Various well-known methods can be applied to bring light out of core 102 and make it propagate in the cladding 101, as shown by arrows 403. Mode converting elements available on the market may be deposited in front of zone A to achieve this. Once light 403 propagates in the cladding area 101, the activation of element 205 may lead to the increase of the refractive index of the material 203, which in turn, will lead to controllable light extraction and leakage losses. The remaining transmitted (through the activation zone 203) light 407 that propagates in the cladding 101 may be transformed back into core guided light 405 if needed, using similar mode converters placed after zone B.

The disclosed device may be also used without the above-mentioned mode converters, for example to create a spatially varying thermal field for tuning fiber gratings or other kinds of fiber structures, etc. This may be used, for example, to tune fiber Bragg grating resonances and dispersion properties.

Figure 5:
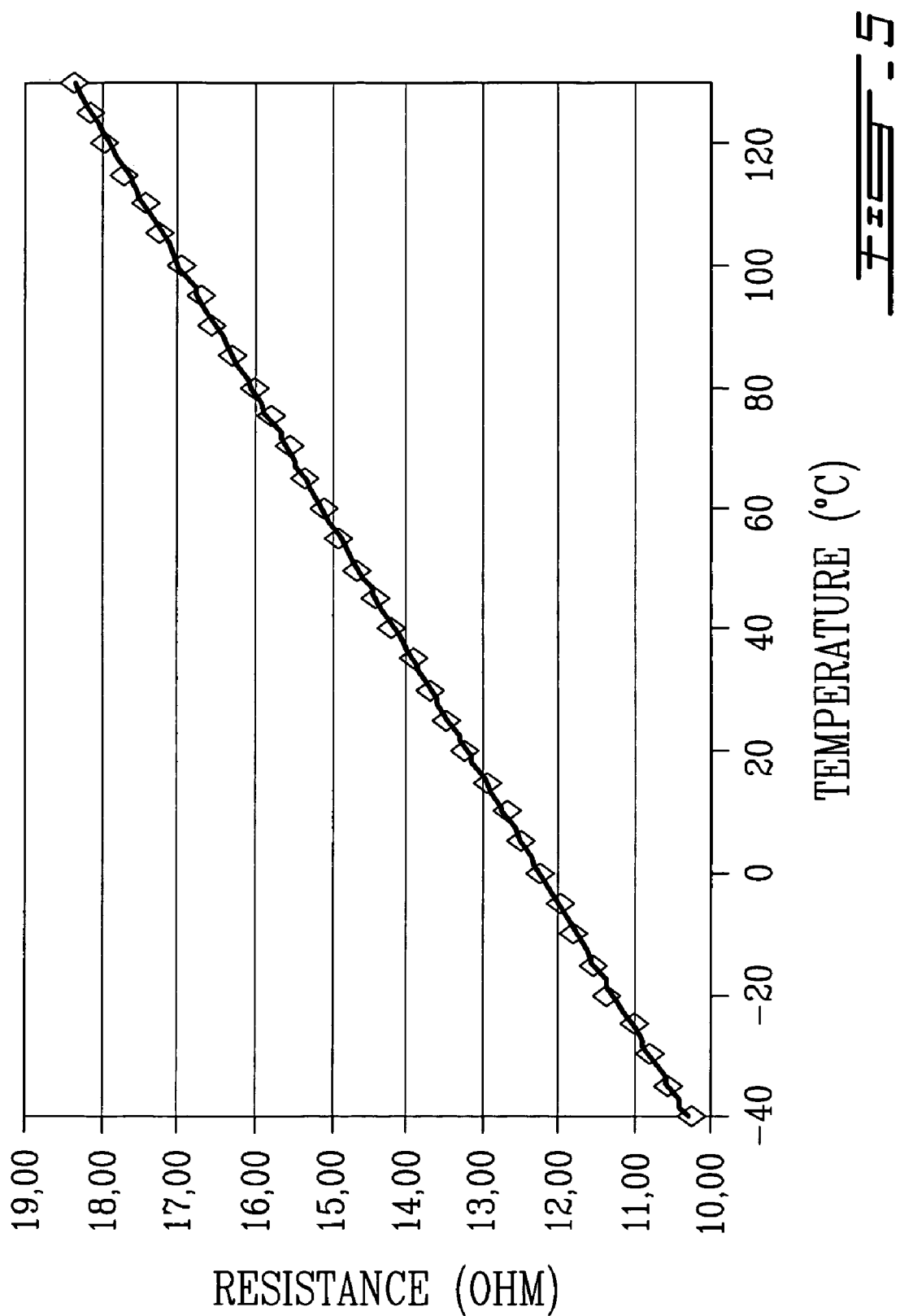
FIG. 5 is a graphical representation of the experimental dependence of the resistance (in Ohm) of a Platinum helicoidal electrode versus its temperature (in degrees Celsius) that may be modified by itself or other heat sources (including the absorbed guided light).

In another embodiment of the present invention the composition of the material of the 3DTEMD is chosen in a way to have an electrical resistance with appropriate temperature dependence. Then, the 3DTEMD provides an electrical feedback signal used to monitor the temperature of the material. FIG. 5 is a graphical representation of the experimental dependence of the resistance (in Ohm) of the Platinum helicoidal electrode (similar to element 205 in FIG. 2) versus its temperature (in degrees Celsius). The temperature of element 205 and its surrounding material may be modified by the element 205 itself or by using another heat source (including the absorbed guided light).

Preferably, the 3DTEMD element is a wire of 20 to 50 micrometers diameter. The materials used to build the 3DTEMD may be selected from a considerably wide range of materials. The electrode composition should comply with the desired electrical properties like resistance and resistance thermal dependence (so-called thermal coefficient) and physical properties like thermal expansion coefficient, solderability, tensile strength, ductibility, thermal conductivity, etc.

Platinum and Nickel are good examples of useful materials for the 3DTEMD (without any restriction on other possible compositions).

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A variable optical attenuator, comprising:
   a portion of a waveguide through which optical energy can propagate having a side surface through which optical energy can be extracted;
   a layer of thermo sensitive material having controllable optical properties, covering said side surface of said portion;
   a helicoidal heating element wrapped around said waveguide and covering at least said layer to control the optical properties of said material by inducing a thermal transfer profile on said material using the heat dissipation of said heater through said material;
   wherein a wave propagation in said waveguide is influenced by said optical properties of said material controlled by said heating element.

2. A variable optical attenuator as claimed in claim 1, wherein said material is wrapped around said waveguide.

3. A variable optical attenuator as claimed in claim 2, wherein said layer, said heating element and said side surface are symmetrical and cylindrical thereby minimizing optical anisotropy related to shear stress due to the material solidification and the variation of a temperature of said heating element.

4. A variable optical attenuator as claimed in claim 2, wherein the portion is etched.

5. A variable optical attenuator as claimed in claim 1, wherein said heating element is a wire.

6. A variable optical attenuator as claimed in claim 5, wherein the element is made of one of platinum, nickel and a conducting material.

7. A variable optical attenuator as claimed in claim 5, wherein at least one of a geometrical cross-section shape, a periodicity step and a diameter of a coiling of said element is changed to affect said thermal transfer profile.

8. A variable optical attenuator as claimed in claim 1, wherein said portion is tapered.

9. A variable optical attenuator as claimed in claim 8, wherein said periodicity step determines a quantity of energy delivered to said material.

10. A variable optical attenuator as claimed in claim 1, wherein the material is made of at least one of monomers and polymers.

11. A variable optical attenuator, comprising:
    a portion of a waveguide through which optical energy can propagate having a side surface through which optical energy can be extracted;
    a layer of thermo sensitive material having controllable optical properties, covering said side surface of said portion;
    a helicoidal heating element wrapped around said waveguide and covering at least said layer to control the optical properties of said material by inducing a thermal transfer profile on said material, wherein said heating element has a measurable temperature coefficient;
    a controller for controlling the temperature of said heating element as a function of said temperature coefficient;
    wherein said temperature of said heating element can be controlled without using an additional temperature probe.

12. A variable optical attenuator, comprising:
    a portion of a waveguide through which optical energy can propagate having a side surface through which optical energy can be extracted;
    a layer of thermo sensitive material having controllable optical properties, covering said side surface of said portion;
    a helicoidal heating element wrapped around said waveguide and covering at least said layer to control the curing of said material using the heat dissipation of said heater through said material, thereby providing a mechanical armature for said material and said waveguide;
    wherein said mechanical armature solidifies said attenuator.

13. A variable optical attenuator as claimed in 12 wherein said helicoidal heating element covers said side surface to mechanically support said thermo sensitive material before and after a curing and solidification process, thereby providing a quasi-open container to avoid at least one of the formation of bubbles, other undesired non uniformities and case to case variations of the volume and form of said material layer.

* * * * *